(12) United States Patent
Moein

(10) Patent No.: US 12,423,422 B2
(45) Date of Patent: Sep. 23, 2025

(54) TETRA SYSTEMS AND METHODS FOR CLUSTERING FILES BASED UPON STRUCTURE

(71) Applicant: Fortinet, Inc., Sunnyvale, CA (US)

(72) Inventor: Samer Moein, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 250 days.

(21) Appl. No.: 18/132,247

(22) Filed: Apr. 7, 2023

(65) Prior Publication Data

US 2024/0338444 A1 Oct. 10, 2024

(51) Int. Cl.
G06F 21/56 (2013.01)
H04L 9/00 (2022.01)

(52) U.S. Cl.
CPC ............ G06F 21/564 (2013.01); H04L 9/008 (2013.01); G06F 2221/033 (2013.01)

(58) Field of Classification Search
CPC .............................. G06F 21/564; H04L 9/008
See application file for complete search history.

(56) References Cited

U.S. PATENT DOCUMENTS

| | | | | |
|---|---|---|---|---|
| 10,116,437 B1* | 10/2018 | Krendelev | .......... | H04L 63/0457 |
| 10,853,495 B2* | 12/2020 | Cooke | .................. | H04L 63/123 |
| 11,500,969 B2* | 11/2022 | Ge | .......... | G06F 21/44 |
| 11,582,221 B1* | 2/2023 | Raj | .......... | H04L 63/06 |
| 11,588,849 B2* | 2/2023 | Sloane | ............... | H04L 63/1416 |
| 11,824,967 B2* | 11/2023 | Jung | .......... | H04L 9/008 |
| 12,143,467 B2* | 11/2024 | Joye | ...................... | H04L 9/3026 |
| 12,197,581 B2* | 1/2025 | Chandra | ............... | H04L 9/3252 |
| 2019/0018961 A1* | 1/2019 | Kostyushko | ............. | H04L 9/002 |
| 2020/0127982 A1* | 4/2020 | Rangaraj | ............. | H04L 63/0435 |
| 2021/0281412 A1* | 9/2021 | Khoury | ................. | H04L 63/126 |
| 2022/0052848 A1* | 2/2022 | Kang | ...................... | G06F 17/17 |
| 2023/0053566 A1* | 2/2023 | Horne | ................. | G06F 21/6227 |
| 2023/0188318 A1* | 6/2023 | Paillier | ................... | H04L 9/008 380/28 |
| 2023/0254113 A1* | 8/2023 | Peng | ...................... | H04L 9/008 380/28 |
| 2024/0176883 A1* | 5/2024 | Dolev | .................... | G06F 21/16 |

* cited by examiner

*Primary Examiner* — Viral S Lakhia
(74) *Attorney, Agent, or Firm* — Jaffery Watson Hamilton DeSanctis LLP

(57) ABSTRACT

Various embodiments provide systems and methods for identifying malicious files based upon file structure.

37 Claims, 9 Drawing Sheets

TETRA SYSTEMS AND METHODS FOR CLUSTERING FILES BASED UPON STRUCTURE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2022, Fortinet, Inc.

FIELD

Embodiments discussed generally relate to systems and methods for detecting malicious computer activity, and more particularly to systems and methods for identifying malicious files based upon file structure.

BACKGROUND

The advent of Malware-as-a-Service (MaaS) and Ransomware-as-a-Service (RaaS) has spread the ability to attack computer systems. Such MaaS and RaaS typically uses a common operational core that is modified to include features for a new type of attack. As such, new types of attack can be formulated and launched with little effort, but at times with devastating effect.

Accordingly, there is a need in the art for advanced systems and methods for detecting malware and/or ransomware attacks.

SUMMARY

Various embodiments provide systems and methods for identifying malicious files based upon file structure.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
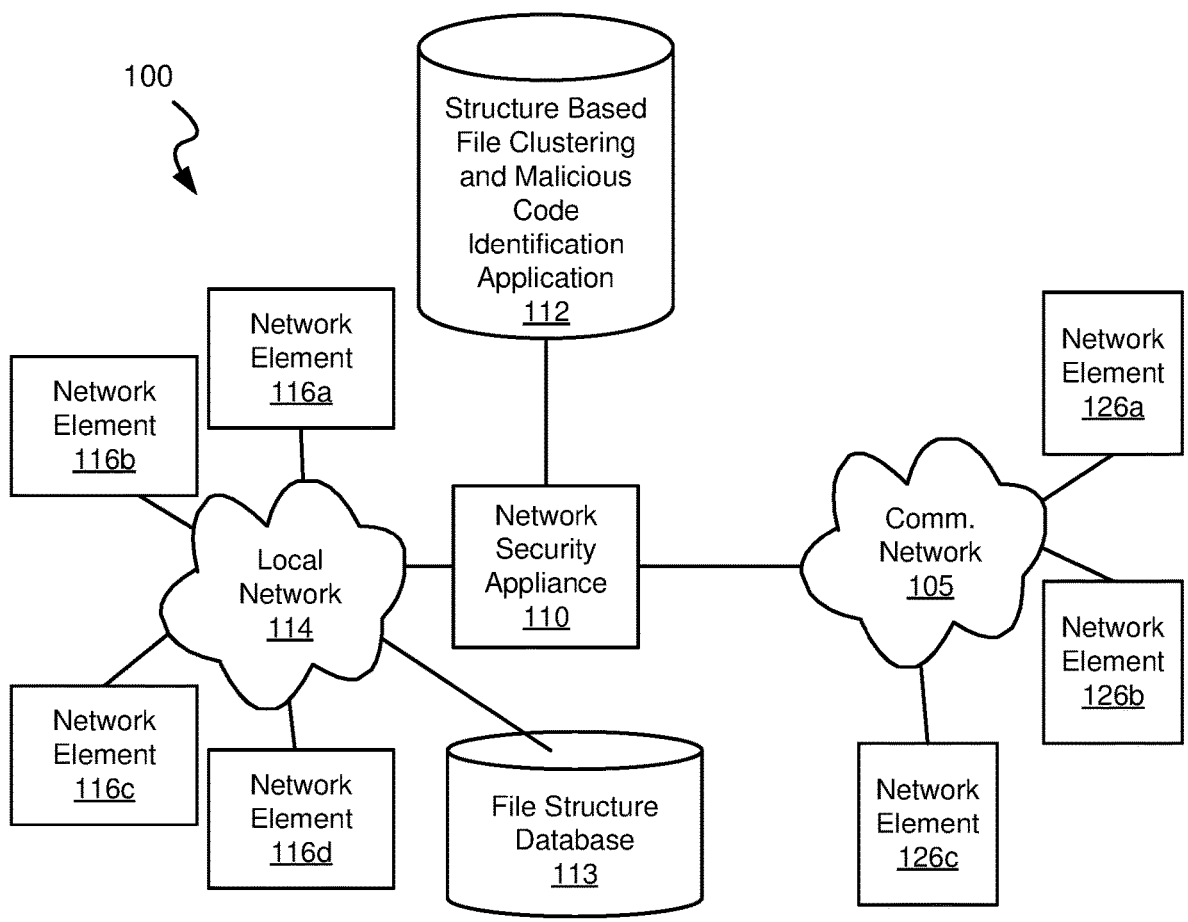
FIGS. 1A-1C illustrate a network architecture including a network security appliance configured for performing structure based file clustering and malicious behavior identification in accordance with some embodiments.

Various embodiments provide systems and methods for identifying malicious files based upon file structure.

It is typical to identify malicious code based upon actions made by the code and/or the content of the code. Such an approaches can be unwieldy in an environment where actions are not easily identifiable as malicious or acceptable, where thousands of tools are available for packing, protecting, encrypting, compressing, and archiving code, and/or where the number of actions separately considered malicious is growing at a rapid pace. It has been found that either in addition to identifying malicious actions or separate from identifying malicious actions, grouping code based upon structure and then identifying the structure as associated with a malicious code can be effective in thwarting attacks.

As more and more malicious actors use code that is generated from a common core with modifications, identifying malicious code based upon structure becomes an increasingly valuable line of defense. In addition to an actual malware code having a structure similar to many other malware codes, thousands of packing, protecting, encrypting, compressing, and archiving tools allow malicious actors to pack their malware and bypass detection systems. These tools are different in processing the files, making it unfeasible to build a system or multiple systems that can efficiently deal with all existing and emerging techniques. Thus, detection based upon code structure rather than code content or actions provides an effective tool for thwarting attacks.

Various embodiments discussed herein rely upon identifying the structure of an executable and permission assigned to malware sections of an executable instead of malware content or in addition to malware content to detect malicious code. Relying on such a structure based approach neutralizes the effect of packing tools and minor changes to a core malware code, which are considered the biggest challenges that face clustering and detection systems. Such embodiments use a set of features that represent important structural parameters to identify malware. These features are encrypted using homomorphic encryption to generate an equivalent representation for the file. Such homomorphic encryption is used to support operations over encrypted representation when needed.

Clustering newly received executables with previously categorized executables is done using a comparison module that identifies a related family (if found) for a newly received executable, a variant of the identified family (if found), and potentially an identical or almost identical structure within the variant (if found). If not found, a newly received executable is categorized as a new family, a new variant of a family, and/or a new file structure within the variant. The relationships with other members of a family known to be malicious allows for identification of a newly received executable as malicious. Said another way, where a family is known to include malicious code, the newly received executable file can be categorized as malicious based upon the relationship, and where relevant one or more playbooks for mitigating an infection from a malicious code can be selected based upon family, variant, and/or identical relationships that are determined.

In some embodiments, various embodiments provide one or more advantages as set forth below: extracted features may be limited to those included in a file header of the newly received executable file; the family/variant/file structure information maintained from previously processed executable files may not contain file content and as such is secure to transfer without revealing sensitive information; and/or the features selected for extraction from a newly received executable file can be chosen based on studying and tested with several million random executable files. Based upon the disclosure provided herein, one of ordinary skill in the art will recognize other advantages that may be achievable through use of one or more of the embodiments discussed herein.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance", a "network element", or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DOS attack detection and mitigation appliances).

As used herein, the phrases "network path", "communication path", or "network communication path" generally refer to a path whereby information may be sent from one end and received on the other. In some embodiments, such paths are referred to commonly as tunnels which are configured and provisioned as is known in the art. Such paths may traverse, but are not limited to traversing, wired or wireless communication links, wide area network (WAN) communication links, local area network (LAN) communication links, and/or combinations of the aforementioned. Based upon the disclosure provided herein, one of ordinary skill in the art will recognize a variety of communication paths and/or combinations of communication paths that may be used in relation to different embodiments.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for clustering executable files. Such methods include: extracting at least a first feature and a second feature from an executable file; forming at least a derivative of the first feature and a derivative of the second feature into a file feature set; applying homomorphic encryption to the file feature set to yield an encrypted set; performing clustering on the encrypted set where the encrypted set is identified as similar to one or more of: a family of executable files, a variant of the family of executable files, and a structure of a variant of the family of executable files.

In some instances of the aforementioned embodiments, the method further includes: formatting the first feature to yield the derivative of the first feature in a first defined format, and formatting the second feature to yield the derivative of the second feature in a second defined format. In some cases, the first defined format includes a first number of bits and wherein the second defined format includes a second number of bits. In some cases, the first feature is one of: a size of optional header, a number of sections, a number of section with executable and writable permission, a file characteristics, a number of sections with executable permission, an empty section, a number of sections with writable permission, a number of sections with readable permission, or an entry point location. In various cases, the second feature is one of: a file alignment, an offset to file header, an accurate header size, a biggest section size, a second biggest section size, a calculated file size, a total overlay size, and an import table size.

In various instances of the aforementioned embodiments where the encrypted set is a first encrypted set, the performing the clustering on the encrypted set includes: calculating a first distance between a first subset of a second encrypted set and a first subset of the first encrypted set; and adding the newly encrypted set to a database as a new family where the first distance is greater than a first threshold. In some cases, the second encrypted set is clustered prior to receiving the first encrypted set.

In one or more instances of the aforementioned embodiments where the encrypted set is a first encrypted set, the performing the clustering on the encrypted set includes: calculating a first distance between a first subset of a second encrypted set and a first subset of the first encrypted set; calculating a second distance between a first element of a second subset of the second encrypted set and a first element of a second subset of the first encrypted set; calculating a third distance between a second element of a second subset of the second encrypted set and a second element of a second subset of the first encrypted set; and determining, by the processing resource: the first distance is less than a first threshold; and a combination of the second distance and the third distance indicate that the first encrypted set is in the same family as the second encrypted set.

In some such instances, the clustering further includes calculating a number of same features exhibited between the first encrypted set and the second encrypted set. In some cases, the clustering further includes indicating that the first encrypted set is the same variant of the family of the second encrypted set when the number of same features exhibited between the first encrypted set and the second encrypted set is less than a variant threshold. In various cases, the clustering further includes indicating that the first encrypted set is the same structure of the variant of the family of the second encrypted set when the number of same features exhibited between the first encrypted set and the second encrypted set is less than an identical threshold.

Other embodiments provide non-transitory computer-readable media that have stored therein instructions that when executed by a processing resource cause the processing resource to perform a method including: extracting at least a first feature and a second feature from an executable file; forming at least a derivative of the first feature and a derivative of the second feature into a file feature set; applying homomorphic encryption to the file feature set to yield an encrypted set; performing clustering on the encrypted set where the encrypted set is identified as similar to one or more of: a family of executable files, a variant of the family of executable files, and a structure of a variant of the family of executable files.

Yet other embodiments provide systems for clustering executable files that include: a processing resource, and a non-transitory computer-readable medium coupled to the processing resource. The non-transitory computer-readable medium has stored therein instructions that when executed by the processing resource cause the processing resource to perform a method including: extracting at least a first feature and a second feature from an executable file; forming at least a derivative of the first feature and a derivative of the second feature into a file feature set; applying homomorphic encryption to the file feature set to yield an encrypted set; performing clustering on the encrypted set where the encrypted set is identified as similar to one or more of: a family of executable files, a variant of the family of executable files, and a structure of a variant of the family of executable files.

Turning to FIG. 1A, network architecture 100 is shown that a network security appliance 110 configured for performing structure based file clustering and malicious behavior identification in accordance with some embodiments. Network security appliance 110 executes a structure based file clustering and malicious code identification application 112, and relies upon a file structure database 113 of previously clustered executables and newly added executables.

In the context of network architecture 100, a number of network elements (e.g., a network element 116a, a network element 116b, a network element 116c, a network element 116d, a network element 126a, a network element 126b, and a network element 126c) are coupled to respective networks (e.g., a local network 114 and a communication network 105). Local network 114 and communication network 105 may respectively be any type of communication network known in the art. Those skilled in the art will appreciate that, local network 114 and/or communication network 105 can be wireless network, a wired network, or a combination thereof that can be implemented as one of the various types of networks, such as an Intranet, a Local Area Network (LAN), a Wide Area Network (WAN), an Internet, and the like. Further, local network 114 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Access to local network 114 is controlled by a network security appliance 110. Network security appliance 110 is coupled to a computer readable storage medium having stored thereon structure based file clustering and malicious code identification application 112. Structure based file clustering and malicious code identification application 112, when executed by one or more processors included in network security appliance 110, provides at least three functions. The first function is that of receiving and identifying an executable as related to one or more of the previously identified executables identified in file structure database 113. The second function is that of updating file structure database 113 to include the newly received executable. The third function is that of classifying the newly received executable as malicious or otherwise based at least in part on its relationship with other executables identified in file structure database 113. Executables may be received from one of network elements 126 and destined for one of network elements 116. Where a newly received executable is identified as malicious, network security appliance 110 may prevent it from being delivered to its destination.

Figure 1B:
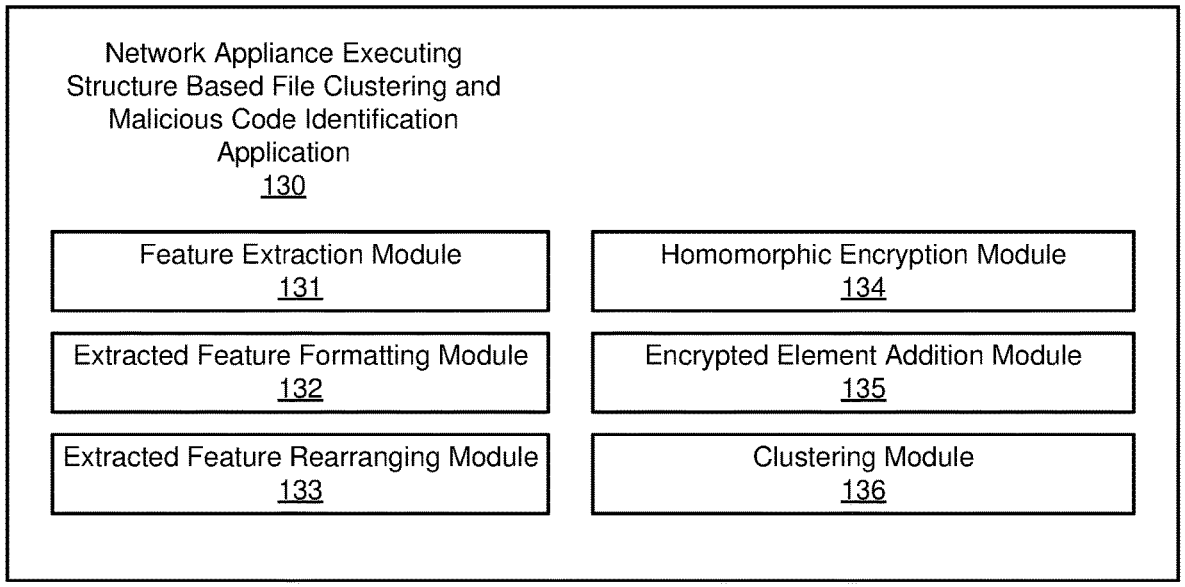

Turning to FIG. 1B, an example implementation of a network appliance executing structure based file clustering and malicious code identification application 130 (e.g., network security appliance 110 executing structure based file clustering and malicious code identification application 112) is shown in accordance with some embodiments. As shown in this example, network appliance executing structure based file clustering and malicious code identification application 130 includes: a feature extraction module 131, an extracted feature formatting module 132, an extracted feature rearranging module 133, a homomorphic encryption module 134, an encrypted element addition module 135, and a clustering module 136.

Feature extraction module 131 is configured to extract selected features from a newly received executable file to yield extracted features. Such extraction may include, but is not limited to, calculating and/or determining features of the received file. The extracted features represent a file outline, execution permissions, header information, and/or overlay structures. In some embodiments, the extracted features include one or more of: Accurate Header Size (AHS), Biggest Section Size (BSS), Second Biggest Section Size (SBSS), Calculated File Size (CFS), File Characteristics (CHAR), Cluster Identifiers (CIDs), Number of Sections with Executable Permission (E), Offset to File Header (E_lfanew), End Overlay Size (EOS), Entry Point Code (EPC), Entry Point Location (EPL), Empty Section (ES), Number of Section with Executable and Writable Permission (EW), File Alignment (FA), The states of the image file (i.e., PE32 or PE32+ executable) (Magic), Number Of Overlays (NOO), Number of Sections (NOS), Number of Sections with Readable Permission (R), Size of Optional Header (SOOH), Total Overlay Size (TOS), Import Table Size (ITS), and/or Number of Sections with Writable Permission (W).

Figure 3A:
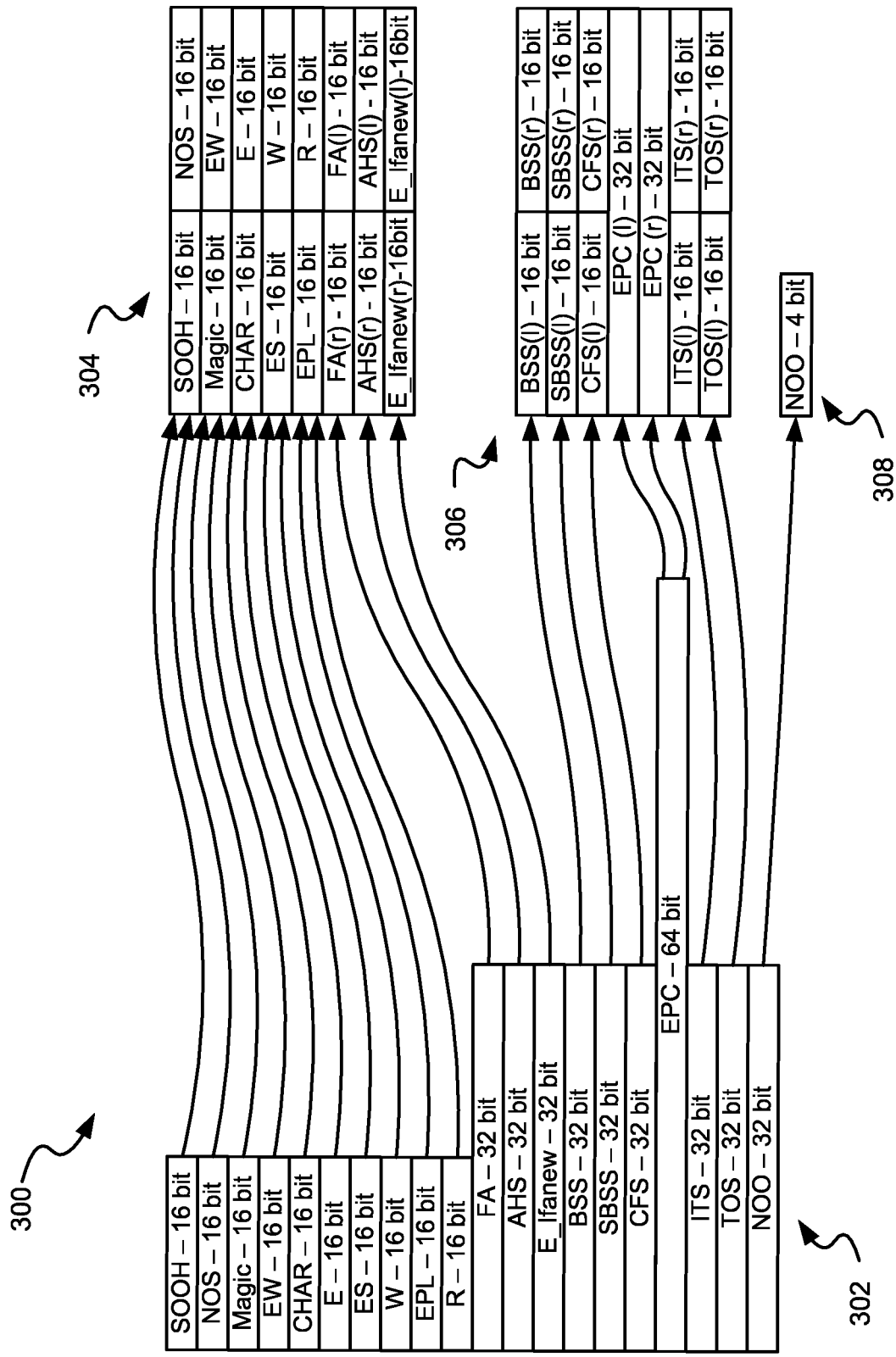
FIGS. 3A-3C graphically show processes discussed in relation to FIG. 2.

Extracted feature formatting module 132 is configured to format the extracted features. In some embodiments such formatting includes formatting the SOOH, NOS, Magic, EW, CHAR, E, ES, W, EPL, and R each to sixteen (16) bits; formatting FA, AHS, E_lfanew, BSS, SBSS, CFS, ITS, and TOS each to thirty-two (32) bits; and formatting EPC to sixty-four (64) bits. This is shown as features 302 of the process 300 on FIG. 3A.

Extracted feature rearranging module 133 is configured to rearrange the formatted, extracted features. In some embodiments such rearranging includes making: (1) a thirty-two (32) bit element with the sixteen (16) bits of SOOH in the most significant bit (MSB) positions and the sixteen (16) bits of NOS in the least significant bit (LSB) positions; (2) a thirty-two (32) bit element with the sixteen (16) bits of Magic in the most MSB positions and the sixteen (16) bits of EW in the LSB positions; (3) a thirty-two (32) bit element with the sixteen (16) bits of CHAR in the MSB positions and the sixteen (16) bits of E in the LSB positions; (4) (2) a thirty-two (32) bit element with the sixteen (16) bits of ES in the MSB positions and the sixteen (16) bits of W in the LSB positions; (5) a thirty-two (32) bit element with the sixteen (16) bits of EPL in the MSB positions and the sixteen (16) bits of R in the LSB positions; (6) a thirty-two (32) bit element with the LSB sixteen (16) bits of FA in the MSB positions and the MSB sixteen (16) bits of FA in the LSB positions; (7) a thirty-two (32) bit element with the LSB sixteen (16) bits of AHS in the MSB positions and the MSB sixteen (16) bits of AHS in the LSB positions; (8) a thirty-two (32) bit element with the LSB sixteen (16) bits of E_lfanew in the MSB positions and the MSB sixteen (16) bits of E_lfanew in the LSB positions; (9) a thirty-two (32) bit element with the MSB sixteen (16) bits of BSS in the MSB positions and the LSB sixteen (16) bits of BSS in the LSB positions; (10) a thirty-two (32) bit element with the MSB sixteen (16) bits of SBSS in the MSB positions and the LSB sixteen (16) bits of SBSS in the LSB positions; (11) a thirty-two (32) bit element with the MSB sixteen (16) bits of CFS in the MSB positions and the LSB sixteen (16) bits of CFS in the LSB positions; (12) a thirty-two (32) bit element with the MSB thirty-two (32) bits of EPC; (13) a thirty-two (32) bit element with the LSB thirty-two (32) bits of EPC; (14) a thirty-two (32) bit element with the MSB sixteen (16) bits of ITS in the MSB positions and the LSB sixteen (16) bits of ITS in the LSB positions; and (15) a thirty-two (32) bit element with the MSB sixteen (16) bits of TOS in the MSB positions and the LSB sixteen (16) bits of TOS in the LSB positions. In addition, a modulo operation is used to divide NOO by a fixed number leaving the remainder four (4) bit value. This is shown in process 300 as rearranged features 304, 306, 308.

Figure 3B:
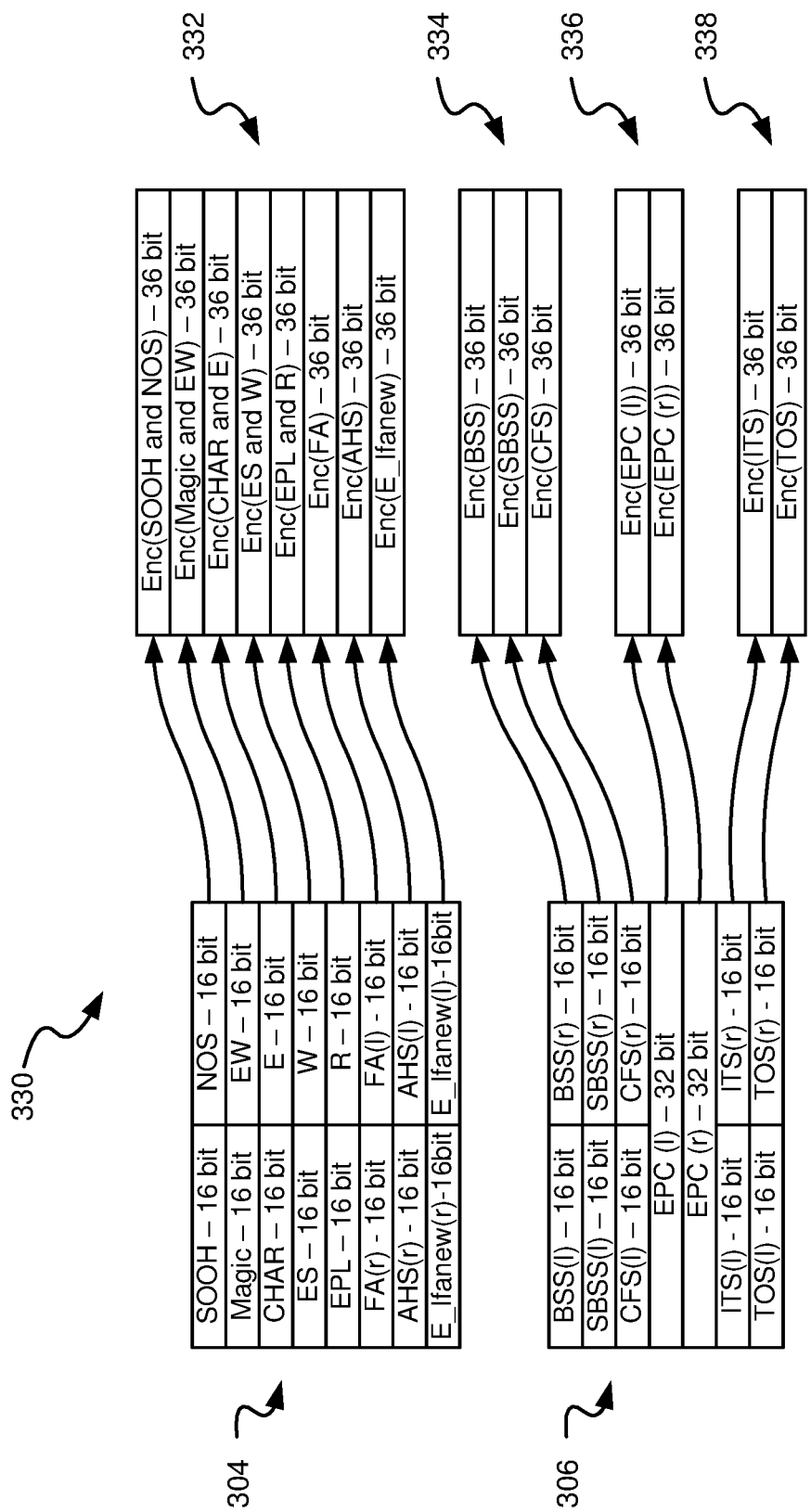

Homomorphic encryption module 134 is configured to apply homomorphic encryption to each of the formatted and rearranged features. Such homomorphic encryption enables complex mathematical operations to be performed on encrypted data without compromising the encryption. Using the embodiment discussed above, each of the fifteen (15) thirty-two (32) bit formatted and rearranged sets of features are homomorphically encrypted resulting in fifteen (15) respective thirty-six (36) bit encrypted feature elements. This is shown in FIG. 3B where process 330 shows homomorphically encrypting each of elements 304, 306 to yield fifteen (15) encrypted elements (eight (8) elements 332, three (3) elements 334, two (2) elements 336, and two (2) elements 338).

Encrypted element addition module 135 is configured to combine various encrypted elements. In some embodiments, this includes adding: eight (8) elements 332 together to yield a single thirty-six (36) bit fixed feature set 362, and two (2) elements 336 to yield a single thirty-six (36) bit feature set 366. Three (3) elements 334 and two (2) elements 338 are not changed by encrypted element addition module 135.

Clustering module 136 is configured to cluster the newly received executable file represented by the encrypted set generated by feature extraction module 131, extracted feature formatting module 132, extracted feature rearranging module 133, homomorphic encryption module 134, and encrypted element addition module 135. He clustering seeks to identify the newly received executable file as within the same family as another encrypted set from a data base, within the same variant and family as another encrypted set from a data base, and/or as identical in structure to another encrypted set from a data base. In one embodiment, clustering module 136 performs the functions discussed below in relation to FIGS. 4A-4B.

Figure 1C:
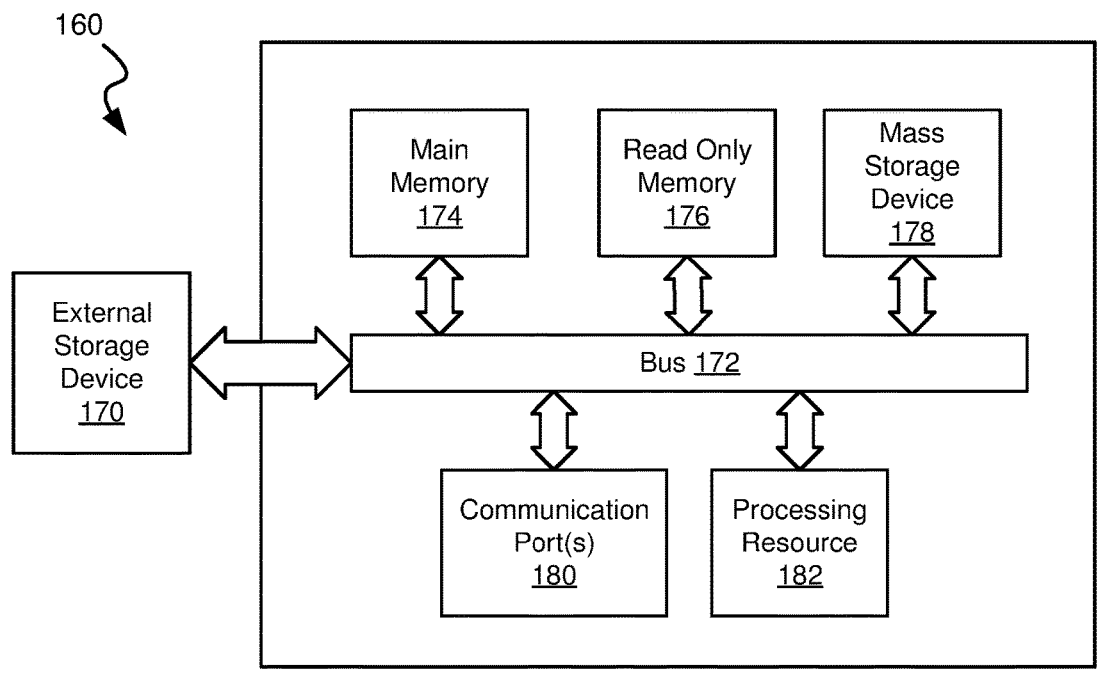

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of network elements 116, 126, and/or network security appliances 110, 120.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 2:
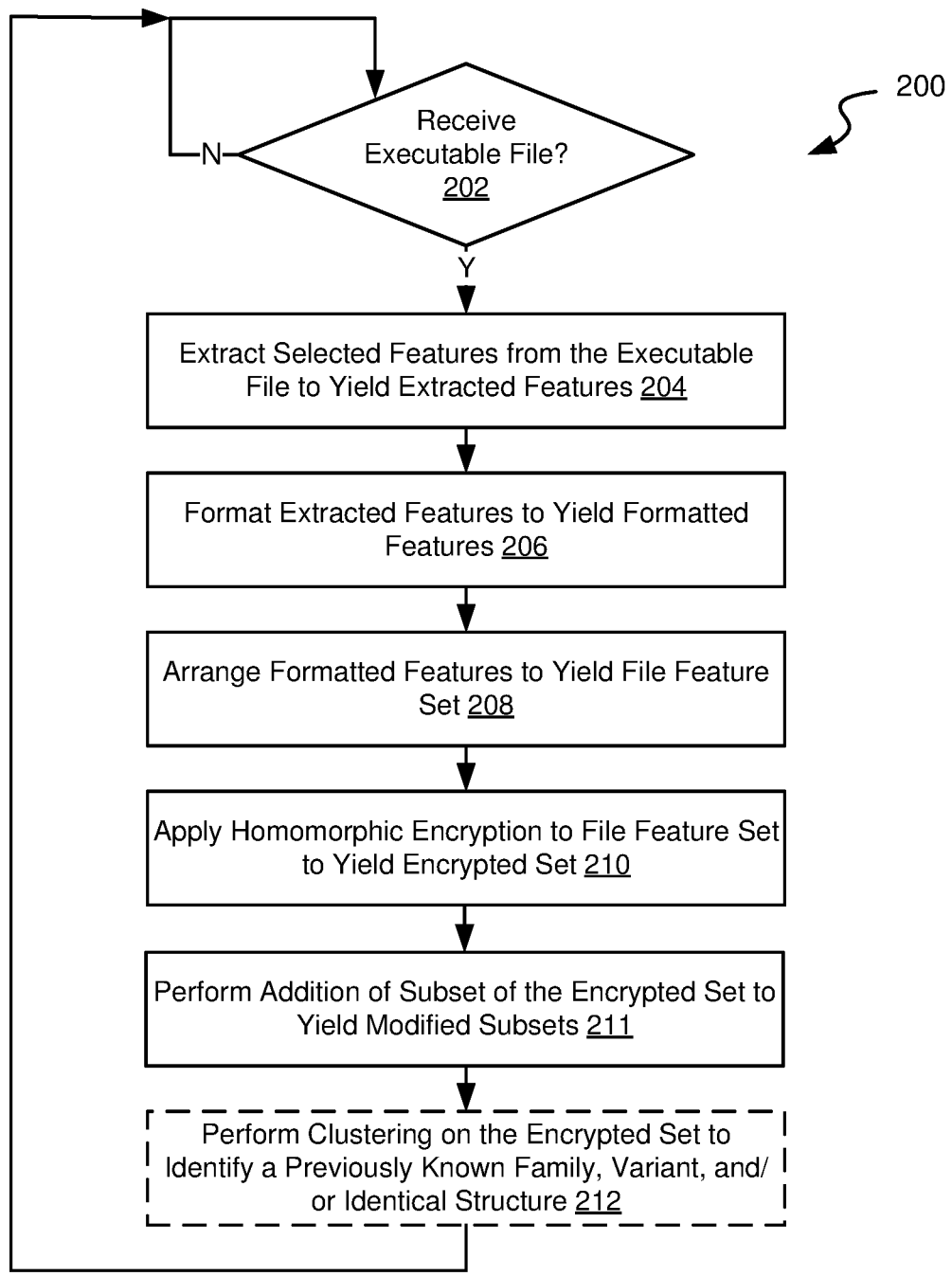
FIGS. 2 and 4A-4B are flow diagrams showing methods in accordance with some embodiments for structure based file clustering and malicious behavior identification.

Turning to FIG. 2, a flow diagram 200 shows a method in accordance with some embodiments for structure based clustering of executable files. Following flow diagram 200, it is determined whether a new executable file has been received (block 202). Any approach known in the art for identifying a file as executable may be used. In some embodiments, all received files are considered executable files and processed. Thus, as used herein, the term executable file is read in a broad sense as any file that can be run separately on a computer or any file that potentially includes an embedded executable code.

Selected features are extracted from the executable file to yield extracted features (block 204). Such extraction may include, but is not limited to, calculating and/or determining features of the received file. The extracted features represent a file outline, execution permissions, header information, and/or overlay structures.

In some embodiments, the extracted features include one or more of: Accurate Header Size (AHS), Biggest Section Size (BSS), Second Biggest Section Size (SBSS), Calculated File Size (CFS), File Characteristics (CHAR), Cluster Identifiers (CIDs), Number of Sections with Executable Permission (E), Offset to File Header (E_lfanew), End Overlay Size (EOS), Entry Point Code (EPC), Entry Point Location (EPL), Empty Section (ES), Number of Section with Executable and Writable Permission (EW), File Alignment (FA), The states of the image file (i.e., PE32 or PE32+ executable) (Magic), Number Of Overlays (NOO), Number of Sections (NOS), Number of Sections with Readable Permission (R), Size of Optional Header (SOOH), Total Overlay Size (TOS), Import Table Size (ITS), and/or Number of Sections with Writable Permission (W). In such embodiments, the selected features are five-hundred twelve (512) bits in size, and are divided into fixed and variable subsets. The fixed features consist of fixed features that reflect the mandatory file layout and permission that should exist for a file to execute as planned. The thirteen (13) fixed features include: SOOH, NOS, Magic, EW, CHAR, E, ES, W, EPL, R, FA, AHS, and E_lfanew. The variable features consist of seven (7) variable features that may have slightly different values among files belong the same family. The seven (7) variable features consist of features that may have slightly different values among files belong the same family. The differences in these variable features lead to different variants within the same family.

The extracted features are formatted (block 206). In some embodiments this includes formatting the SOOH, NOS, Magic, EW, CHAR, E, ES, W, EPL, and R each to sixteen (16) bits; formatting FA, AHS, E_lfanew, BSS, SBSS, CFS, ITS, and TOS each to thirty-two (32) bits; and formatting EPC to sixty-four (64) bits. This is shown as features 302 of the process 300 on FIG. 3A.

In addition, the formatted features are rearranged (block 208). In some embodiments this includes making: (1) a thirty-two (32) bit element with the sixteen (16) bits of SOOH in the most significant bit (MSB) positions and the sixteen (16) bits of NOS in the least significant bit (LSB) positions; (2) a thirty-two (32) bit element with the sixteen (16) bits of Magic in the most MSB positions and the sixteen (16) bits of EW in the LSB positions; (3) a thirty-two (32) bit element with the sixteen (16) bits of CHAR in the MSB positions and the sixteen (16) bits of E in the LSB positions; (4) (2) a thirty-two (32) bit element with the sixteen (16) bits of ES in the MSB positions and the sixteen (16) bits of W in the LSB positions; (5) a thirty-two (32) bit element with the sixteen (16) bits of EPL in the MSB positions and the sixteen (16) bits of R in the LSB positions; (6) a thirty-two (32) bit element with the LSB sixteen (16) bits of FA in the MSB positions and the MSB sixteen (16) bits of FA in the LSB positions; (7) a thirty-two (32) bit element with the LSB sixteen (16) bits of AHS in the MSB positions and the MSB sixteen (16) bits of AHS in the LSB positions; (8) a thirty-two (32) bit element with the LSB sixteen (16) bits of E_lfanew in the MSB positions and the MSB sixteen (16) bits of E_Ifanew in the LSB positions; (9) a thirty-two (32) bit element with the MSB sixteen (16) bits of BSS in the MSB positions and the LSB sixteen (16) bits of BSS in the LSB positions; (10) a thirty-two (32) bit element with the MSB sixteen (16) bits of SBSS in the MSB positions and the LSB sixteen (16) bits of SBSS in the LSB positions; (11) a thirty-two (32) bit element with the MSB sixteen (16) bits of CFS in the MSB positions and the LSB sixteen (16) bits of CFS in the LSB positions; (12) a thirty-two (32) bit element with the MSB thirty-two (32) bits of EPC; (13) a thirty-two (32) bit element with the LSB thirty-two (32) bits of EPC; (14) a thirty-two (32) bit element with the MSB sixteen (16) bits of ITS in the MSB positions and the LSB sixteen (16) bits of ITS in the LSB positions; and (15) a thirty-two (32) bit element with the MSB sixteen (16) bits of TOS in the MSB positions and the LSB sixteen (16) bits of TOS in the LSB positions. In addition, a modulo operation is used to divide NOO by a fixed number leaving the remainder four (4) bit value. This is shown in process 300 as rearranged features 304, 306, 308.

Homomorphic encryption is applied to each of the formatted and rearranged features (block 210). Such homomorphic encryption is the conversion of a data set into ciphertext that can be analyzed and worked with as if it were still in its original form. Homomorphic encryption enables complex mathematical operations to be performed on encrypted data without compromising the encryption. Using the embodiment discussed above, each of the fifteen (15) thirty-two (32) bit formatted and rearranged sets of features are homomorphically encrypted resulting in fifteen (15) respective thirty-six (36) bit encrypted feature elements. This is shown in FIG. 3B where process 330 shows homomorphically encrypting each of elements 304, 306 to yield fifteen (15) encrypted elements (eight (8) elements 332, three (3) elements 334, two (2) elements 336, and two (2) elements 338).

The encrypted elements are then combined using addition over encryption (block 211). Using the embodiment discussed above, eight (8) elements 332 are added together to yield a single thirty-six (36) bit fixed feature set 362, and two (2) elements 336 are added together to yield a single thirty-six (36) bit feature set 366. Three (3) elements 334 and two (2) elements 338 are not changed.

A clustering process is applied to the encrypted set (i.e., the combination of fixed feature set 362, feature set 366, three (3) elements 334, and two (2) elements 338) to identify, where possible, a previously identified family, variant, and/or identical structure to the newly received executable (block 212). Where a previously identified family, variant, or identical structure is not found, the process creates a new family, variant, and/or identical structure for the newly received executable. Block 212 is shown in dashed lines as it is represented in greater detail in FIGS. 4A-4B discussed below.

Figure 4A:
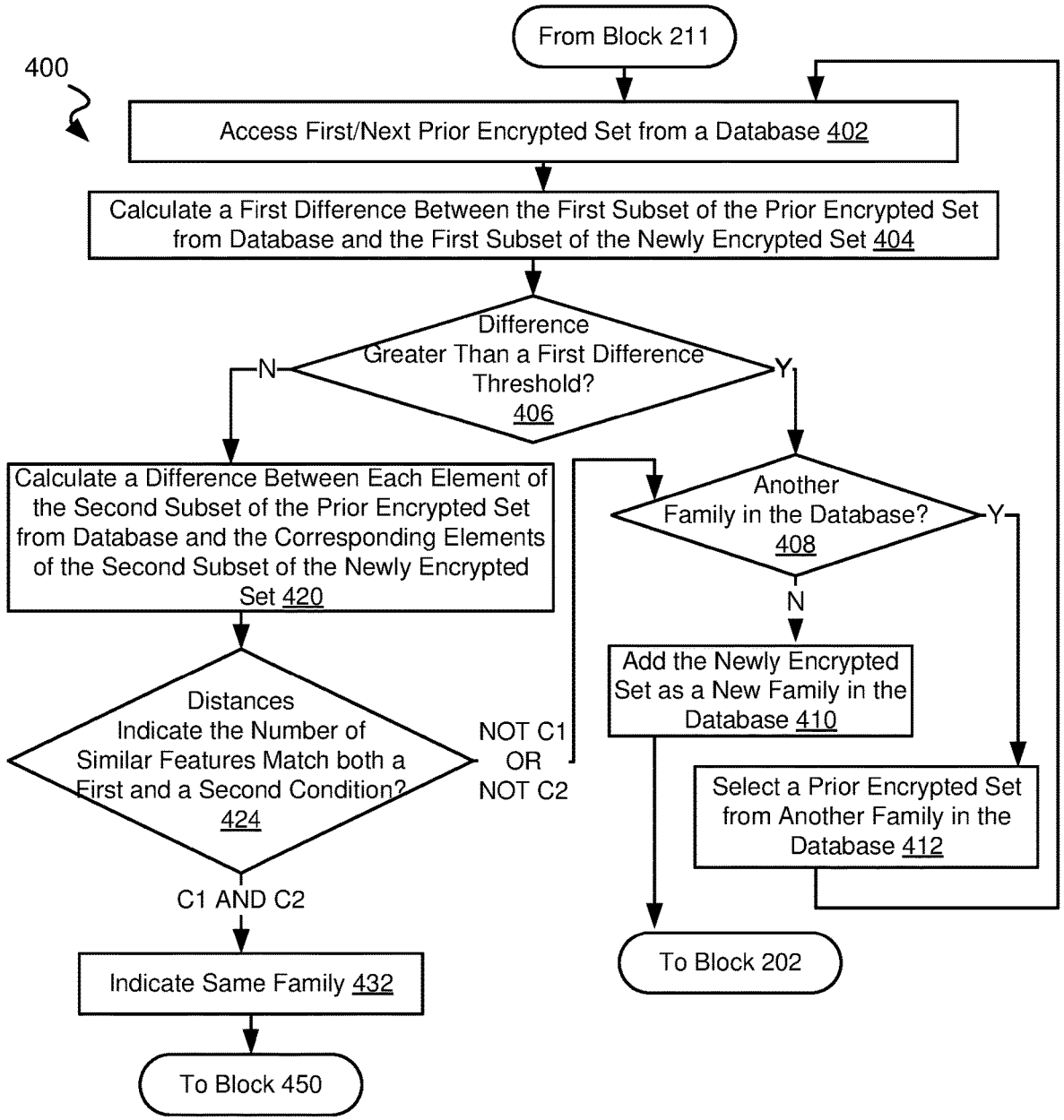
Figure 4B:
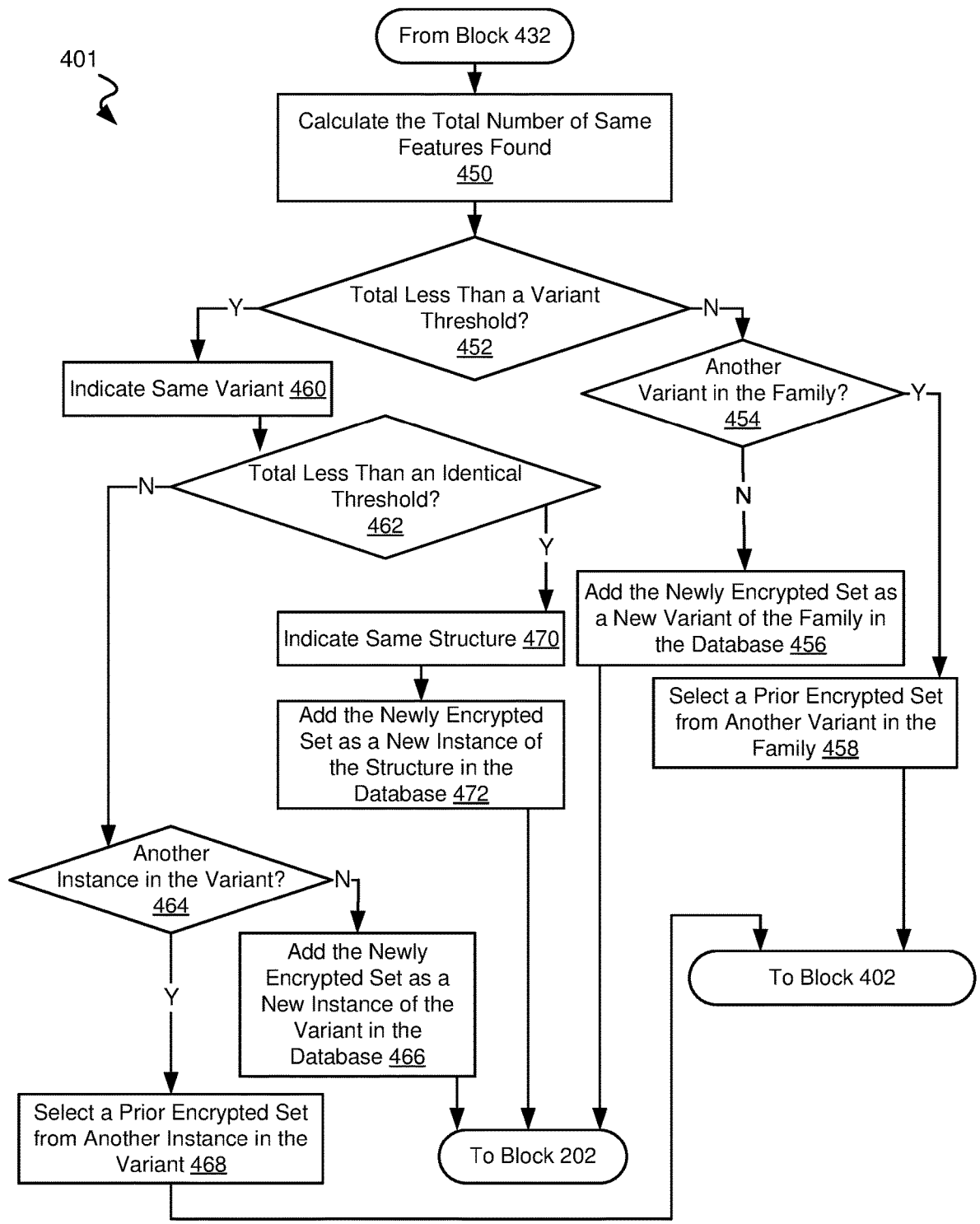

Turning to FIG. 4A-4B, flow diagrams 400, 401 show a detailed embodiment of a method for clustering newly received executables is shown. Following flow diagram 400, a database of previously clustered executables is accessed, and a first/next prior encrypted set is accessed from the database (block 402). The accessed prior encrypted set includes the same elements as those generated for the newly encrypted set (e.g., the combination of fixed feature set 362, feature set 366, three (3) elements 334, and two (2) elements 338). These are used for comparison with the newly encrypted set to determine whether the two sets are from the same family, same variant, and/or are identical in structure.

A first difference is calculated between a first subset of the prior encrypted set accessed from the database and a first subset of the newly encrypted set (block 404). In some embodiments, the first subset is the combination of fixed features (i.e., fixed feature set 362). In such embodiments, a difference is calculated between the thirty-six (36) bit fixed feature set of the prior encrypted set accessed from the database and the thirty-six (36) bit fixed feature set of the newly encrypted set. This fixed feature set in the embodiment incorporates SOOH, NOS, Magic, EW, CHAR, E, ES, W, EPL, R, FA, AHS, and E_lfanew.

Figure 5:
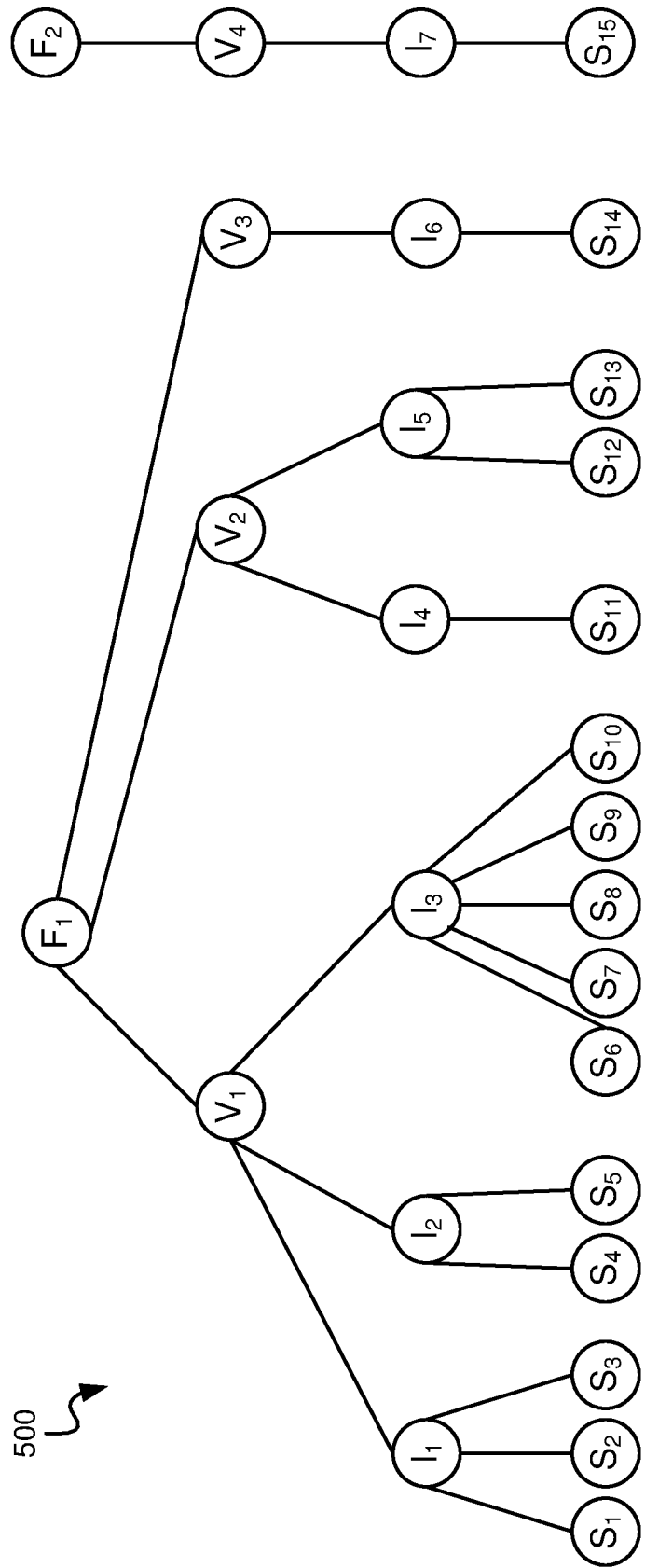
FIG. 5 shows an example clustering structure that may be used and augmented using the processes discussed in relation to FIGS. 4A-4B.

Turning to FIG. 5, a representation 500 of a database is shown including a first family ($F_1$) and a second family ($F_2$) of prior encrypted sets. As shown $F_1$ includes a number of variants (i.e., $V_1$, $V_2$, $V_3$) which are groups of executable files that are structurally similar sufficient to be considered from the same family, but sufficiently different that they warrant separate classification as different variants. Each of $V_1$, $V_2$, $V_3$ include one or more file structures considered identical (e.g., $I_1$ and $I_2$ for $V_1$; $I_3$ for $V_2$; and $I_4$ and $I_5$ for $V_3$). Below each of the file structures are one or more instances of the identical file structures (e.g., $S_1$, $S_2$, and $S_3$ for $I_1$; $S_4$ and $S_5$ for $I_2$; $S_6$, $S_7$, $S_8$, $S_9$ and $S_{10}$ for $I_3$; $S_{11}$ for $I_4$; $S_{12}$ and $S_{13}$ for $I_5$; and $S_{14}$ for $I_6$). It is noted that such database may include thousands or more of families, variants, file structures, and instances. Of note, in some instances identicals under variants $V_1$, $V_2$, or $V_3$ may be the same as identicals under another of variants $V_1$, $V_2$, or $V_3$. For example, identical $I_4$ may be the same as identical $I_1$, identical $I_5$ may be the same as identical $I_2$; and/or identical $I_6$ may be the same as identical $I_1$. Similarly, in various instances variants under families F1 and F2 may be the same. For example, variant $V_4$ may be the same as variant $V_1$. Said another way, each family may have the same malicious and identical versions. Using representation 500 as an example, $S_1$ from family $F_1$ may be initially selected for consideration.

Returning to FIG. 4A, it is determined whether the difference between the two feature sets is within a defined first difference threshold (block 406). In some embodiments, the defined first difference threshold is user programmable. Where the difference between the two is not within a defined first difference threshold (block 406), the executable files represented by the respective feature sets are not considered to be of the same family. Said another way, the structure of the two executable files is sufficiently different that they are not considered sufficiently similar to characterize the two as the same for purposes of characterizing the newly received executable file as malicious, benign, or unknown. In such a case where the two feature sets are not within the defined first difference threshold (block 406), it is determined whether another family in the database exists (block 408). No other prior encrypted set from the family are considered, but rather only those from different families as the family level similarity has already not been identified Where another family remains in the database that have not yet been considered (block 408), a prior encrypted set from another family in the database is selected (block 412). The processes starting at block 402 are repeated for the recently selected prior encrypted set. Again, using representation 500 as an example, if both $F_1$ and $F_2$ previously existed, instance $S_{15}$ would be selected for consideration as it is not in family $F_1$ which has already been considered and rejected as not similar.

Alternatively, where another family does not remain in the database to be considered (block 408), the encrypted set for the newly received executable is stored in the database as a new family, new variant, and new identical file structure (block 410). Again, using representation 500 as an example, if only $F_1$ previously existed and thus no additional families would remain for consideration if the newly received executable file was not found to be from the same family as instance $S_1$, the encrypted set for the newly received executable would be included in the database as a new instance $S_{15}$ as a new file structure $I_7$, a new variant $V_4$, and a new family $F_2$. Once the newly received executable file has been represented in the database (block 410), the process is returned to block 202 of FIG. 2 to await reception of another executable file.

Figure 3C:
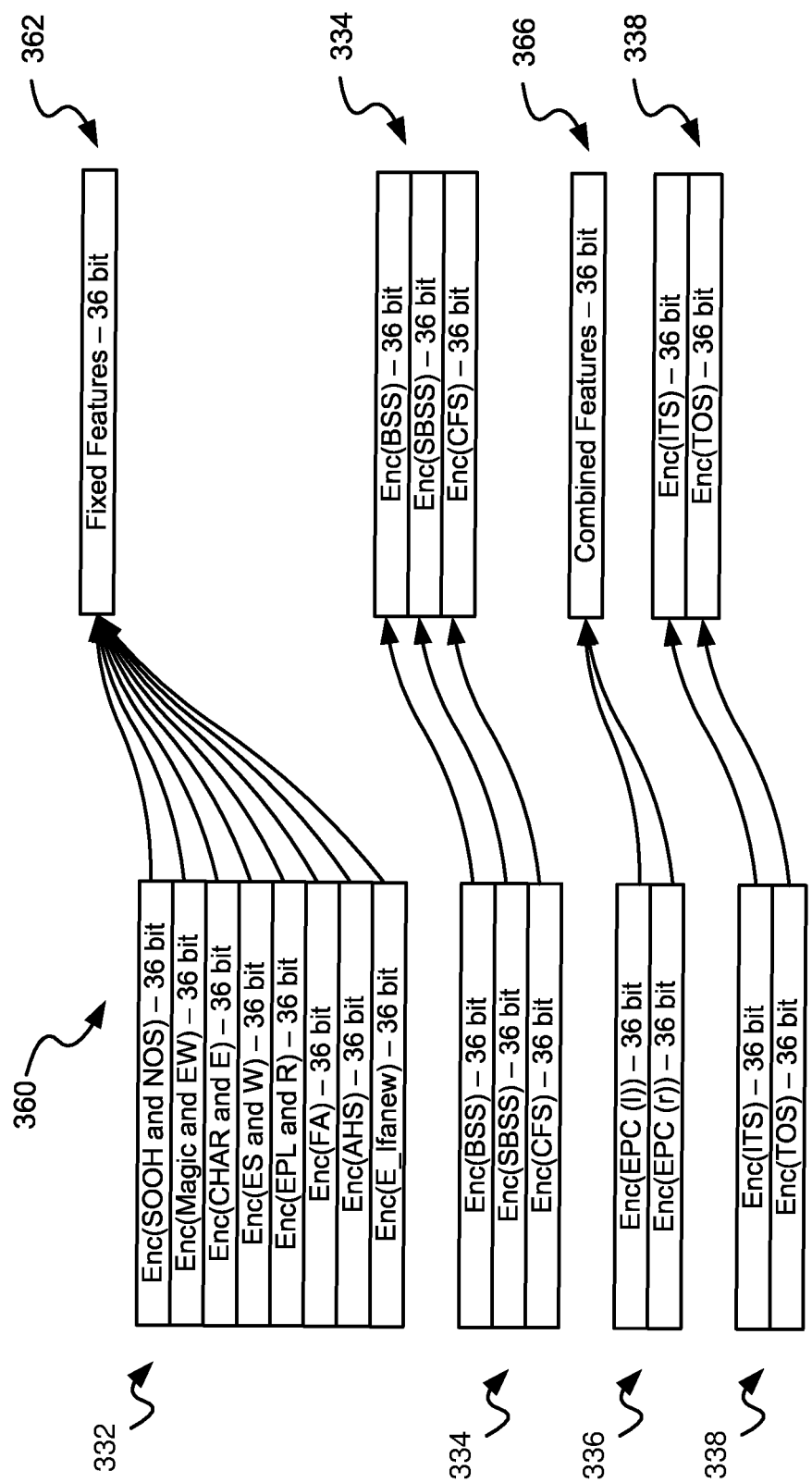

Otherwise, where the difference between the two is within a defined first difference threshold (block 406), the newly received executable file is likely within the same family as the prior encrypted set to which it is compared. It turns then to determine whether it is in fact within the same family, and within one of the variants of the family and/or identical to one of the file structures already included in the database. To do this, a difference is calculated from each element of a second subset of the prior encrypted set from the database (block 420). In some embodiments, the second subset includes feature set 366, three (3) elements 334, two (2) elements 338, and four (4) bit NOO 308 as shown in FIGS. 3B-3C. In such embodiments: (A) a difference is calculated between a feature set 366 of the prior encrypted set from the database and a feature set 366 for the newly received executable file; (B) differences are calculated between each of the three (3) elements 334 of the prior encrypted set from the database and the corresponding elements of the newly received executable file; (C) differences are calculated between each of the two (2) elements 338 of the prior encrypted set from the database and the corresponding elements of the newly received executable file; and (D) differences are calculated between the four (4) bit NOO 308 of the prior encrypted set from the database and the corresponding element of the newly received executable file.

It is determined if the differences between additional features of the prior encrypted set and corresponding encoded features of the newly received executable file indicate whether or not two conditions (C1 and C2) are met (block 424). The first condition (C1) is that at least a first defined number of features within three (3) elements 334 of the prior encrypted set are considered the same, and the second condition (C2) is that at least a second defined number of features within a combination of combined features 366, two (2) elements 338, and four (4) bit NOO 308 of the prior encrypted set are considered the same. In some embodiments, the first defined number of features is one (1), and the second defined number of features is three (3).

A feature is considered to be the same when it is within a difference threshold that in some cases may be user programmable. Thus, using the embodiment where the first defined number is one (1), this requirement is met where at least one of the encrypted BSS, SBSS, and/or CFS of the prior encrypted set is found to be the same as the corresponding encrypted element for the newly received executable file. Similarly, where the second defined number is three (3), at least three of (i) the combined features 366, (ii) encrypted ITS, (iii) encrypted TOS, and (iv) four (4) bit NOO must be found to be the same to meet the requirement. Where the first of the two conditions is not met (NOT C1 of block 424) or where the second of the two conditions is not met (NOT C2 of block 424), then the newly received executable file is not considered to be in the same family. In such a case, the processes beginning art block 408 are performed for the newly received executable file. Said another way, the structure of the two executable files is sufficiently different that they are not considered sufficiently similar to characterize the two as the same for purposes of characterizing the newly received executable file as malicious, benign, or unknown.

Alternatively, where both of the two conditions are met (C1 AND C2 of block 424), then the newly received executable file is considered to be in the same family as the prior encrypted set and such is indicated (block 432). It turns then to determine whether the newly received executable file is within one of the variants of the family and/or identical to one of the file structures already included in the database which is described in more detail starting with block 450 of FIG. 4B.

Turning to FIG. 4B and following flow diagram 401, the total number of same features is calculated (block 450). In the example embodiment, the finding that the fixed feature set was within the threshold counts as thirteen (13) same features (i.e., SOOH, NOS, Magic, EW, CHAR, E, ES, W. EPL, R. FA, AHS, and E_lfanew). This value of thirteen (13) is added to: the number of same features across three (3) elements 334 which is between one (1) and three (3); and the number of same features across combined features 366, two (2) elements 338, and four (4) bit NOO 308 which is between three (3) and four (4). This results in a value between seventeen (17) and twenty (20) depending upon the similarity between the prior encrypted set from the database and that from the newly received executable file.

It is determined whether the calculated total of same features is less than a variant threshold (block 452). In some embodiments, the variant threshold is nineteen (19). Where the calculated total is less than the variant threshold (block 452), it is determined whether there is another variant in the family that remains to be considered (block 454). Again, using representation 500 as an example, if the encrypted set is for Instance $S_1$ and thus the encrypted set corresponding to the newly received executable file is considered to be part of family $F_1$, other variants (e.g., $V_2$ and $V_3$) remain to be considered. Where no variants remain to be considered (block 452), the encrypted set corresponding to the newly received executable file is added to the database as a new instance(S) under a new file structure (I) and new variant (V) under the identified family (e.g., $F_1$) (block 456). Once the newly received executable file has been represented in the database (block 456), the process is returned to block 202 of FIG. 2 to await reception of another executable file.

Otherwise, where the calculated total of same features is not less than the variant threshold (block 452), the newly received executable file is considered to be of the same variant and family as the prior encrypted set which is indicated (block 460). In such a case, it is determined whether the calculated total of same features is less than an identical threshold (block 462). In some embodiments, the identical threshold is twenty (20). Where the calculated total is less than the identical threshold (block 462), it is determined whether there is another instance in the family and variant that remains to be considered (block 464). Again, using representation 500 as an example, if the encrypted set is for Instance $I_1$ and thus the encrypted set corresponding to the newly received executable file is considered to be part of variant $V_1$ and family $F_1$, other instances (e.g., $S_2$ and $S_3$) remain to be considered. Where no instances remain to be considered (block 464), the encrypted set corresponding to the newly received executable file is added to the database as a new instance(S) under a new file structure (I) and the identified variant (e.g., $V_1$) and family (e.g., $F_1$) (block 466). Once the newly received executable file has been represented in the database (block 466), the process is returned to block 202 of FIG. 2 to await reception of another executable file.

Where, on the other hand, the calculated total of same features is not less than the identical threshold (block 462), the newly received executable file is considered to be identical to the file structure of the prior encrypted set which is indicated (block 470). IN such a case, the encrypted set corresponding to the newly received executable file is added to the database as a new instance(S) under the identified file structure (e.g., $I_1$), the identified variant (e.g., $V_1$), and family (e.g., $F_1$) (block 472). Once the newly received executable file has been represented in the database (block 472), the process is returned to block 202 of FIG. 2 to await reception of another executable file.

In conclusion, the present disclosure provides for novel systems, devices, and methods. While detailed descriptions of one or more embodiments have been given above, various alternatives, modifications, and equivalents will be apparent to those skilled in the art without varying from the spirit of the claims. Therefore, the above description should not be taken as limiting the scope of the inventions, which are defined by the appended claims.

What is claimed is:

1. A method for clustering executable files, the method comprising:
   extracting, by a processing resource, at least a first feature and a second feature from an executable file, wherein the first feature is selected from a group consisting of: a size of optional header, a number of sections, a number of section with executable and writable permission, a file characteristics, a number of sections with executable permission, an empty section, a number of sections with writable permission, a number of sections with readable permission, and an entry point location;
   forming, by the processing resource, at least a derivative of the first feature and a derivative of the second feature into a file feature set;
   applying, by the processing resource, homomorphic encryption to the file feature set to yield an encrypted set; and
   performing, by the processing resource, clustering on the encrypted set wherein the encrypted set is identified as similar to one or more of: a family of executable files, a variant of the family of executable files, and a structure of a variant of the family of executable files.

2. The method of claim 1, the method further comprising:
   formatting, by the processing resource, the first feature to yield the derivative of the first feature in a first defined format; and
   formatting, by the processing resource, the second feature to yield the derivative of the second feature in a second defined format.

3. The method of claim 2, wherein the first defined format includes a first number of bits and wherein the second defined format includes a second number of bits.

4. The method of claim 1, wherein the second feature is selected from a group consisting of: a file alignment, an offset to file header, an accurate header size, a biggest section size, a second biggest section size, a calculated file size, a total overlay size, and an import table size.

5. The method of claim 1, wherein the encrypted set is a first encrypted set, and wherein the performing the clustering on the encrypted set comprises:
calculating, by the processing resource, a first distance between a first subset of a second encrypted set and a first subset of the first encrypted set; and
adding, by the processing resource, the newly encrypted set to a database as a new family where the first distance is greater than a first threshold.

6. The method of claim 5, wherein the second encrypted set is clustered prior to receiving the first encrypted set.

7. The method of claim 1, wherein the encrypted set is a first encrypted set, and wherein the performing the clustering on the encrypted set comprises:
calculating, by the processing resource, a first distance between a first subset of a second encrypted set and a first subset of the first encrypted set;
calculating, by the processing resource, a second distance between a first element of a second subset of the second encrypted set and a first element of a second subset of the first encrypted set;
calculating, by the processing resource, a third distance between a second element of a second subset of the second encrypted set and a second element of a second subset of the first encrypted set; and
determining, by the processing resource:
the first distance is less than a first threshold; and
a combination of the second distance and the third distance indicate that the first encrypted set is in the same family as the second encrypted set.

8. The method of claim 7, wherein the clustering further comprises:
calculating, by the processing resource, a number of same features exhibited between the first encrypted set and the second encrypted set.

9. The method of claim 8, wherein the clustering further comprises:
indicating, by the processing resource, that the first encrypted set is the same variant of the family of the second encrypted set when the number of same features exhibited between the first encrypted set and the second encrypted set is less than a variant threshold.

10. The method of claim 8, wherein the clustering further comprises:
indicating, by the processing resource, that the first encrypted set is the same structure of the variant of the family of the second encrypted set when the number of same features exhibited between the first encrypted set and the second encrypted set is less than an identical threshold.

11. A system for clustering executable files, the system comprising:
a processing resource;
a non-transitory computer-readable medium, coupled to the processing resource, and having stored therein instructions that when executed by the processing resource cause the processing resource to:
extract at least a first feature and a second feature from an executable file, wherein the first feature is selected from a group consisting of: a size of optional header, a number of sections, a number of section with executable and writable permission, a file characteristics, a number of sections with executable permission, an empty section, a number of sections with writable permission, a number of sections with readable permission, and an entry point location, and wherein the second feature is selected from a group consisting of: a file alignment, an offset to file header, an accurate header size, a biggest section size, a second biggest section size, a calculated file size, a total overlay size, and an import table size;
form at least a derivative of the first feature and a derivative of the second feature into a file feature set;
apply homomorphic encryption to the file feature set to yield an encrypted set; and
perform clustering on the encrypted set wherein the encrypted set is identified as similar to one or more of: a family of executable files, a variant of the family of executable files, and a structure of a variant of the family of executable files.

12. The system of claim 11, wherein the non-transitory computer-readable medium further has stored therein instructions that when executed by the processing resource cause the processing resource to:
format the first feature to yield the derivative of the first feature in a first defined format; and
format the second feature to yield the derivative of the second feature in a second defined format.

13. The system of claim 12, wherein the first defined format includes a first number of bits and wherein the second defined format includes a second number of bits.

14. The system of claim 11, wherein the encrypted set is a first encrypted set, and wherein the performing the clustering on the encrypted set comprises:
calculating a first distance between a first subset of a second encrypted set and a first subset of the first encrypted set; and
adding the newly encrypted set to a database as a new family where the first distance is greater than a first threshold.

15. The system of claim 11, wherein the encrypted set is a first encrypted set, and wherein the performing the clustering on the encrypted set comprises:
calculating a first distance between a first subset of a second encrypted set and a first subset of the first encrypted set;
calculating a second distance between a first element of a second subset of the second encrypted set and a first element of a second subset of the first encrypted set;
calculating a third distance between a second element of a second subset of the second encrypted set and a second element of a second subset of the first encrypted set; and
determining:
the first distance is less than a first threshold; and
a combination of the second distance and the third distance indicate that the first encrypted set is in the same family as the second encrypted set.

16. The system of claim 15, wherein the clustering further comprises:
calculating a number of same features exhibited between the first encrypted set and the second encrypted set.

17. The system of claim 16, wherein the clustering further comprises:
indicating that the first encrypted set is the same variant of the family of the second encrypted set when the number of same features exhibited between the first encrypted set and the second encrypted set is less than a variant threshold.

18. The system of claim 16, wherein the clustering further comprises:

indicating that the first encrypted set is the same structure of the variant of the family of the second encrypted set when the number of same features exhibited between the first encrypted set and the second encrypted set is less than an identical threshold.

19. A non-transitory computer-readable medium, the non-transitory computer readable medium having stored therein instructions that when executed by a processing resource cause the processing resource to perform a method comprising:
   extracting at least a first feature and a second feature from an executable file, wherein the first feature is selected from a group consisting of: a size of optional header, a number of sections, a number of section with executable and writable permission, a file characteristics, a number of sections with executable permission, an empty section, a number of sections with writable permission, a number of sections with readable permission, and an entry point location;
   forming at least a derivative of the first feature and a derivative of the second feature into a file feature set;
   applying homomorphic encryption to the file feature set to yield an encrypted set; and
   clustering the encrypted set, wherein the encrypted set is identified as similar to one or more of: a family of executable files, a variant of the family of executable files, and a structure of a variant of the family of executable files.

20. A method for clustering executable files, the method comprising:
   extracting, by a processing resource, at least a first feature and a second feature from an executable file;
   forming, by the processing resource, at least a derivative of the first feature and a derivative of the second feature into a file feature set;
   applying, by the processing resource, homomorphic encryption to the file feature set to yield an encrypted set; and
   performing, by the processing resource, clustering on the encrypted set wherein the encrypted set is identified as similar to one or more of: a family of executable files, a variant of the family of executable files, and a structure of a variant of the family of executable files, wherein the encrypted set is a first encrypted set, and wherein the performing the clustering on the encrypted set comprises:
   calculating, by the processing resource, a first distance between a first subset of a second encrypted set and a first subset of the first encrypted set; and
   adding, by the processing resource, the newly encrypted set to a database as a new family where the first distance is greater than a first threshold.

21. The method of claim 20, the method further comprising:
   formatting, by the processing resource, the first feature to yield the derivative of the first feature in a first defined format including a first number of bits; and
   formatting, by the processing resource, the second feature to yield the derivative of the second feature in a second defined format including a second number of bits.

22. The method of claim 20, wherein the performing the clustering on the encrypted set further comprises:
   calculating, by the processing resource, a second distance between a first element of a second subset of the second encrypted set and a first element of a second subset of the first encrypted set;
   calculating, by the processing resource, a third distance between a second element of a second subset of the second encrypted set and a second element of a second subset of the first encrypted set; and
   determining, by the processing resource:
      the first distance is less than a first threshold; and
      a combination of the second distance and the third distance indicate that the first encrypted set is in the same family as the second encrypted set.

23. The method of claim 22, wherein the clustering further comprises:
   calculating, by the processing resource, a number of same features exhibited between the first encrypted set and the second encrypted set.

24. The method of claim 23, wherein the clustering further comprises:
   indicating, by the processing resource, that the first encrypted set is the same variant of the family of the second encrypted set when the number of same features exhibited between the first encrypted set and the second encrypted set is less than a variant threshold; and
   indicating, by the processing resource, that the first encrypted set is the same structure of the variant of the family of the second encrypted set when the number of same features exhibited between the first encrypted set and the second encrypted set is less than an identical threshold.

25. A method for clustering executable files, the method comprising:
   extracting, by a processing resource, at least a first feature and a second feature from an executable file;
   forming, by the processing resource, at least a derivative of the first feature and a derivative of the second feature into a file feature set;
   applying, by the processing resource, homomorphic encryption to the file feature set to yield an encrypted set; and
   performing, by the processing resource, clustering on the encrypted set, wherein the encrypted set is identified as similar to one or more of: a family of executable files, a variant of the family of executable files, and a structure of a variant of the family of executable files, and wherein the encrypted set is a first encrypted set, and wherein the performing the clustering on the encrypted set comprises:
   calculating, by the processing resource, a first distance between a first subset of a second encrypted set and a first subset of the first encrypted set;
   calculating, by the processing resource, a second distance between a first element of a second subset of the second encrypted set and a first element of a second subset of the first encrypted set;
   calculating, by the processing resource, a third distance between a second element of a second subset of the second encrypted set and a second element of a second subset of the first encrypted set; and
   determining, by the processing resource:
      the first distance is less than a first threshold; and
      a combination of the second distance and the third distance indicate that the first encrypted set is in the same family as the second encrypted set.

26. The method of claim 25, the method further comprising:
   formatting, by the processing resource, the first feature to yield the derivative of the first feature in a first defined format including a first number of bits; and formatting, by the processing resource, the second feature to yield the derivative of the second feature in a second defined format including a second number of bits.

27. The method of claim 26, wherein the clustering further comprises:
calculating, by the processing resource, a number of same features exhibited between the first encrypted set and the second encrypted set.

28. The method of claim 27, wherein the clustering further comprises:
indicating, by the processing resource, that the first encrypted set is the same variant of the family of the second encrypted set when the number of same features exhibited between the first encrypted set and the second encrypted set is less than a variant threshold; and
indicating, by the processing resource, that the first encrypted set is the same structure of the variant of the family of the second encrypted set when the number of same features exhibited between the first encrypted set and the second encrypted set is less than an identical threshold.

29. A system for clustering executable files, the system comprising:
a processing resource;
a non-transitory computer-readable medium, coupled to the processing resource, and having stored therein instructions that when executed by the processing resource cause the processing resource to:
extract at least a first feature and a second feature from an executable file;
form at least a derivative of the first feature and a derivative of the second feature into a file feature set;
apply homomorphic encryption to the file feature set to yield an encrypted set; and
perform clustering on the encrypted set, wherein the encrypted set is identified as similar to one or more of: a family of executable files, a variant of the family of executable files, and a structure of a variant of the family of executable files, and wherein the encrypted set is a first encrypted set, and wherein the performing the clustering on the encrypted set comprises:
calculating a first distance between a first subset of a second encrypted set and a first subset of the first encrypted set; and
adding the newly encrypted set to a database as a new family where the first distance is greater than a first threshold.

30. The system of claim 29, wherein the non-transitory computer-readable medium further has stored therein instructions that when executed by the processing resource cause the processing resource to:
format the first feature to yield the derivative of the first feature in a first defined format including a first number of bits; and
format the second feature to yield the derivative of the second feature in a second defined format including a second number of bits.

31. The system of claim 29, wherein the performing the clustering on the encrypted set further comprises:
calculating a second distance between a first element of a second subset of the second encrypted set and a first element of a second subset of the first encrypted set;
calculating a third distance between a second element of a second subset of the second encrypted set and a second element of a second subset of the first encrypted set; and
determining:
the first distance is less than a first threshold; and
a combination of the second distance and the third distance indicate that the first encrypted set is in the same family as the second encrypted set.

32. The system of claim 31, wherein the clustering further comprises:
calculating a number of same features exhibited between the first encrypted set and the second encrypted set.

33. The system of claim 32, wherein the clustering further comprises:
indicating that the first encrypted set is the same variant of the family of the second encrypted set when the number of same features exhibited between the first encrypted set and the second encrypted set is less than a variant threshold; and
indicating that the first encrypted set is the same structure of the variant of the family of the second encrypted set when the number of same features exhibited between the first encrypted set and the second encrypted set is less than an identical threshold.

34. A system for clustering executable files, the system comprising:
a processing resource;
a non-transitory computer-readable medium, coupled to the processing resource, and having stored therein instructions that when executed by the processing resource cause the processing resource to:
extract at least a first feature and a second feature from an executable file;
form at least a derivative of the first feature and a derivative of the second feature into a file feature set;
apply homomorphic encryption to the file feature set to yield an encrypted set; and
perform clustering on the encrypted set, wherein the encrypted set is identified as similar to one or more of: a family of executable files, a variant of the family of executable files, and a structure of a variant of the family of executable files, and wherein the encrypted set is a first encrypted set, and wherein the performing the clustering on the encrypted set comprises:
calculating a first distance between a first subset of a second encrypted set and a first subset of the first encrypted set;
calculating a second distance between a first element of a second subset of the second encrypted set and a first element of a second subset of the first encrypted set;
calculating a third distance between a second element of a second subset of the second encrypted set and a second element of a second subset of the first encrypted set; and
determining:
the first distance is less than a first threshold; and
a combination of the second distance and the third distance indicate that the first encrypted set is in the same family as the second encrypted set.

35. The system of claim 34, wherein the non-transitory computer-readable medium further has stored therein instructions that when executed by the processing resource cause the processing resource to:
format the first feature to yield the derivative of the first feature in a first defined format including a first number of bits; and
format the second feature to yield the derivative of the second feature in a second defined format including a second number of bits.

36. The system of claim 35, wherein the clustering further comprises:
  calculating a number of same features exhibited between the first encrypted set and the second encrypted set.

37. The system of claim 36, wherein the clustering further comprises:
  indicating that the first encrypted set is the same variant of the family of the second encrypted set when the number of same features exhibited between the first encrypted set and the second encrypted set is less than a variant threshold; and
  indicating that the first encrypted set is the same structure of the variant of the family of the second encrypted set when the number of same features exhibited between the first encrypted set and the second encrypted set is less than an identical threshold.

* * * * *